(12) United States Patent
Denny, Jr.

(10) Patent No.: US 12,042,811 B2
(45) Date of Patent: Jul. 23, 2024

(54) POWERED SPRAYER FOR HOME USE

(71) Applicant: Herbert Lee Denny, Jr., Reidsville, NC (US)

(72) Inventor: Herbert Lee Denny, Jr., Reidsville, NC (US)

(*) Notice: Subject to any disclaimer, the term of this patent is extended or adjusted under 35 U.S.C. 154(b) by 645 days.

(21) Appl. No.: 16/706,390

(22) Filed: Dec. 6, 2019

(65) Prior Publication Data

US 2021/0170432 A1   Jun. 10, 2021

(51) Int. Cl.
*B05B 7/32* (2006.01)
*A01C 21/00* (2006.01)
*A01C 23/04* (2006.01)
*A01M 7/00* (2006.01)
*B05B 7/04* (2006.01)

(52) U.S. Cl.
CPC .............. *B05B 7/32* (2013.01); *A01C 21/00* (2013.01); *A01C 23/042* (2013.01); *A01C 23/047* (2013.01); *A01M 7/0046* (2013.01); *B05B 7/0408* (2013.01)

(58) Field of Classification Search
CPC ....... B05B 7/32; B05B 7/0408; B05B 12/087; B05B 9/01; B05B 12/006; B05B 9/0403; A01M 7/0046; A01C 21/00; A01C 23/042; A01C 23/047

USPC .......................................................... 239/310
See application file for complete search history.

(56) References Cited

U.S. PATENT DOCUMENTS

| | | | | |
|---|---|---|---|---|
| 3,435,989 A | * | 4/1969 | Lorenzen ................ | G01F 11/28 222/1 |
| 4,998,836 A | * | 3/1991 | Scripnick ................. | B05B 7/30 137/878 |
| 6,112,367 A | * | 9/2000 | Burr .......................... | A47L 1/08 15/320 |
| 2014/0053453 A1 | * | 2/2014 | Peterson ............. | A01M 25/008 43/124 |

* cited by examiner

*Primary Examiner* — Chee-Chong Lee
(74) *Attorney, Agent, or Firm* — COATS & BENNETT, PLLC

(57) ABSTRACT

A powered spray system designed for home use comprises a chemical supply tank, a sprayer for applying a chemical in the chemical supply tank, and a coupling connecting a water source with the chemical supply tank and sprayer for mixing chemical contained in the chemical supply tank with a stream of water as the water is sprayed. The coupling comprises a first inlet configured to connect to a standard garden hose for connecting the coupling to the water source, an outlet configured to connect to a standard garden hose for connecting the coupling to the sprayer, and a second inlet configured to connect to the chemical supply tank.

16 Claims, 4 Drawing Sheets

POWERED SPRAYER FOR HOME USE

TECHNICAL FIELD

The present disclosure relates generally to lawn and garden equipment and, more particularly, to a powered sprayer designed for home use.

BACKGROUND

In order to maintain a healthy lawn and/or garden at home, various chemicals such as fertilizer, pesticides, fungicides, and herbicides need to be applied to the lawn and/or garden at regular intervals. Most common lawn and garden chemicals can be purchased in liquid form and applied to the lawn and/or garden using a sprayer. The most common form of sprayers used for this purpose are hand-held sprayers and garden hose sprayers.

Conventional hand-held sprayers include a small hand-held tank that contains a lawn chemical. The tank includes an attached sprayer and can be pressured so that the chemicals can be sprayed on the lawn or garden. One problem with hand-held sprayers is that the tank has a small capacity so that the user must re-fill the tank frequently. Another problem is that the pressure in the tank does not remain constant while the chemical is being applied, so that the application of the chemicals can be uneven.

Garden hose sprayers typically comprise a sprayer with a chemical tank that attaches to the end of a garden hose. The concentrated chemical in the tank mixes with the water as the water flows through the sprayer. A drawback of garden hose sprayers is that the tank is typically small and holds only a small amount of concentrated chemical. Also, it can be difficult to control the amount of chemical that is applied.

Powered sprayers are also known but are more expensive than hand-held sprayers and require more knowledge and skill to use. For most homeowners, the additional costs and time learning to properly use a powered sprayer is not justified. Accordingly, powered sprayers are used primarily by professional landscapers.

SUMMARY

The present disclosure relates to a powered spray system designed for home use. The powered spray system comprises a chemical supply tank, a sprayer for applying a chemical in the chemical supply tank, and a coupling connecting a water source with the chemical supply tank and sprayer for mixing chemical contained in the chemical supply tank with a stream of water as the water is sprayed. The coupling comprises a first inlet configured to connect to a standard garden hose for connecting the coupling to the water source, an outlet configured to connect to a standard garden hose for connecting the coupling to the sprayer, and a second inlet configured to connect to the chemical supply tank.

DETAILED DESCRIPTION

Figure 1:
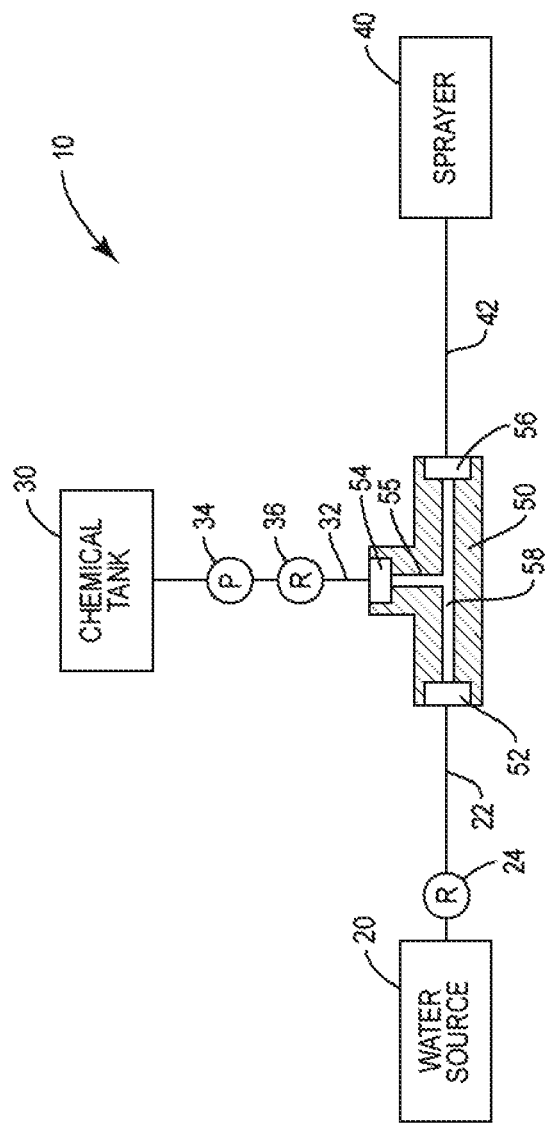
FIG. 1 illustrates an exemplary spray system according to an embodiment.

Referring now to the drawings, FIG. 1 illustrates an exemplary spray system, which is indicated generally by the numeral 10. The spray system 10 comprises a water source 20, a chemical supply tank 30, a sprayer 40, and a coupling 50 that connects the water source 20, chemical supply tank 30 and sprayer 40.

Water source 20 may comprise, for example, a conventional household spigot. A standard garden hose 20 connects the water source 20 to a first inlet 52 of the coupling 50. The spigot or other water source 20 may have a pressure regulator 24 attached thereto to regulate the pressure at the inlet 52 of the coupling 50. One end of the garden hose 22 connects to the spigot 20 or regulator 24. The opposite end connects to the inlet 52, which is configured to connect to a standard garden hose. For example, the inlet 52 may be configured as a standard ⅝" female garden hose fitting.

The chemical supply tank 30 contains a concentrated chemical that is to be sprayed on the lawn or garden. The chemical supply tank 30 connects to a second inlet 54 of the coupling 50 via a chemical feed line 32. The second inlet 54 may be configured, for example, as a standard ¼ inch female National Pipe Tapered (NPT) fitting designed to pull tight to make a seal. A sealant compound or PTFE (polytetrafluoroethylene) tape may be used to ensure a leak-free seal at the inlets 52, 54 and outlet 56. When operational, a pump 34 and a pressure regulator 36 provide a continuous supply of concentrated chemical to the second inlet 54 via the chemical feed line 32, which mixes with the water flowing through the coupling 50.

A second standard garden hose 42 connects the outlet 56 of the coupling 56 to a sprayer 40. One end of the hose 42 connects to the sprayer 40 while the opposite end connects to the outlet 56 of the coupling 50. Outlet 56 is configured as a standard garden hose fitting, such as a ⅝" female garden hose fitting.

Fluid passage 58 connects the first inlet 52 of the coupling 50 to the outlet 56 so that water flows from the water source 20 through the coupling 50 and onward to the sprayer 40. The second inlet 54 of the coupling 50 connects to the fluid passage 58 via a fluid passage 55 so that concentrated chemical mixes with the stream of water as the stream passes through the coupling 50.

In use, water flows through the coupling 50 from the water source 20 to the sprayer 40 when the sprayer 40 is actuated. As the water flows through the coupling 50, concentrated chemical from the chemical supply tank 30 is fed to the second inlet 54 of the coupling 50 and mixes with the water flowing through the coupling 50. Regulator 36 can be adjusted or set to control the amount of chemical that is mixed with the water flowing through the coupling 50. Pressure regulator 24 connected to the water source 20 ensures that the water is supplied at a constant pressure. The pressure regulator 24 can be pre-set to deliver water at the desired pressure. In other embodiments, the pressure regulator 24 may be adjustable. In some embodiments, the pressure regulator 24 can be omitted.

In the embodiment shown in FIG. 1, the coupling 50 comprises a unitary member, i.e. single piece, made of plastic or metal. A plastic coupling 50 can be injection molded as a unitary member at very low cost. The unitary coupling 50 enables a homeowner to enjoy the benefits of a professional quality spray system 10 assembled with off-the-shelf components that can be purchased at low cost at any hardware store.

Figure 2:
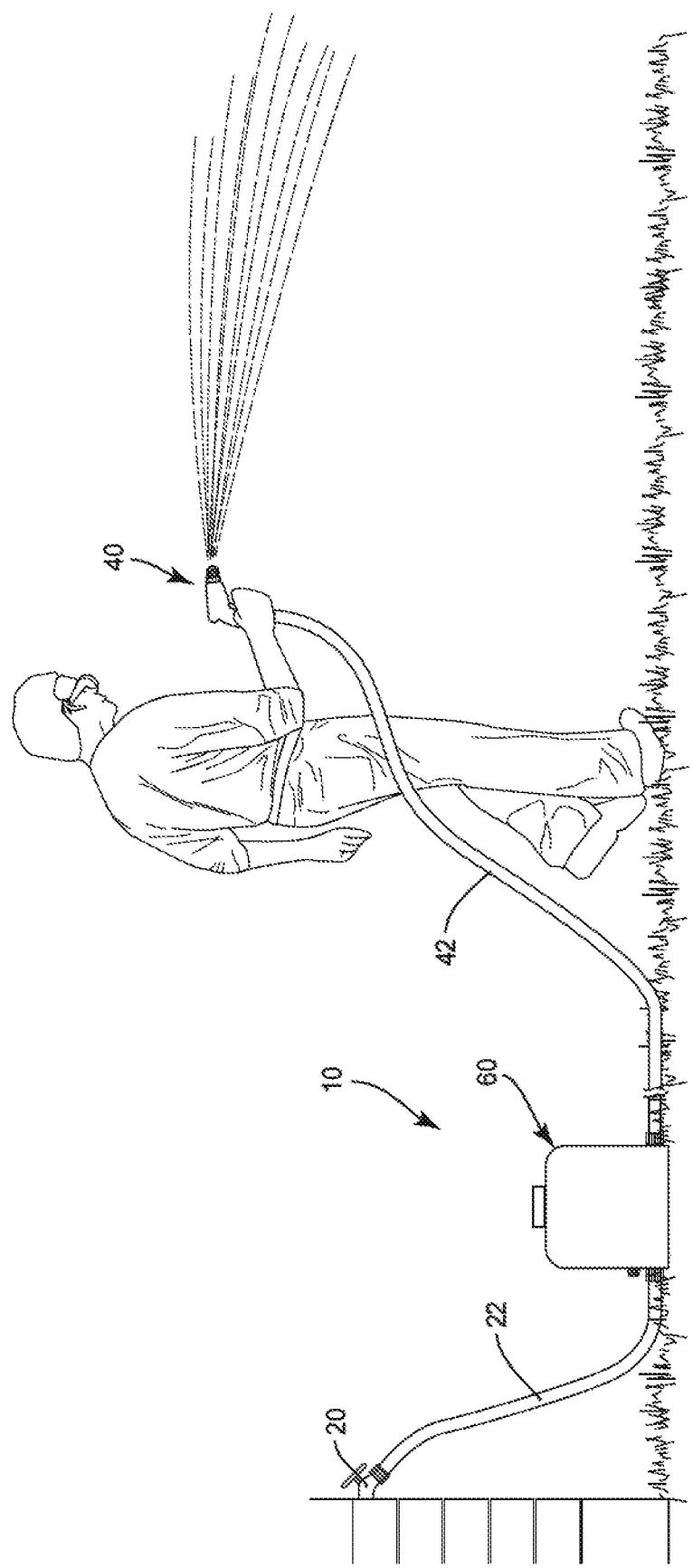
FIG. 2 is a perspective view of a packaged version of the spray system according to another embodiment.
Figure 3:
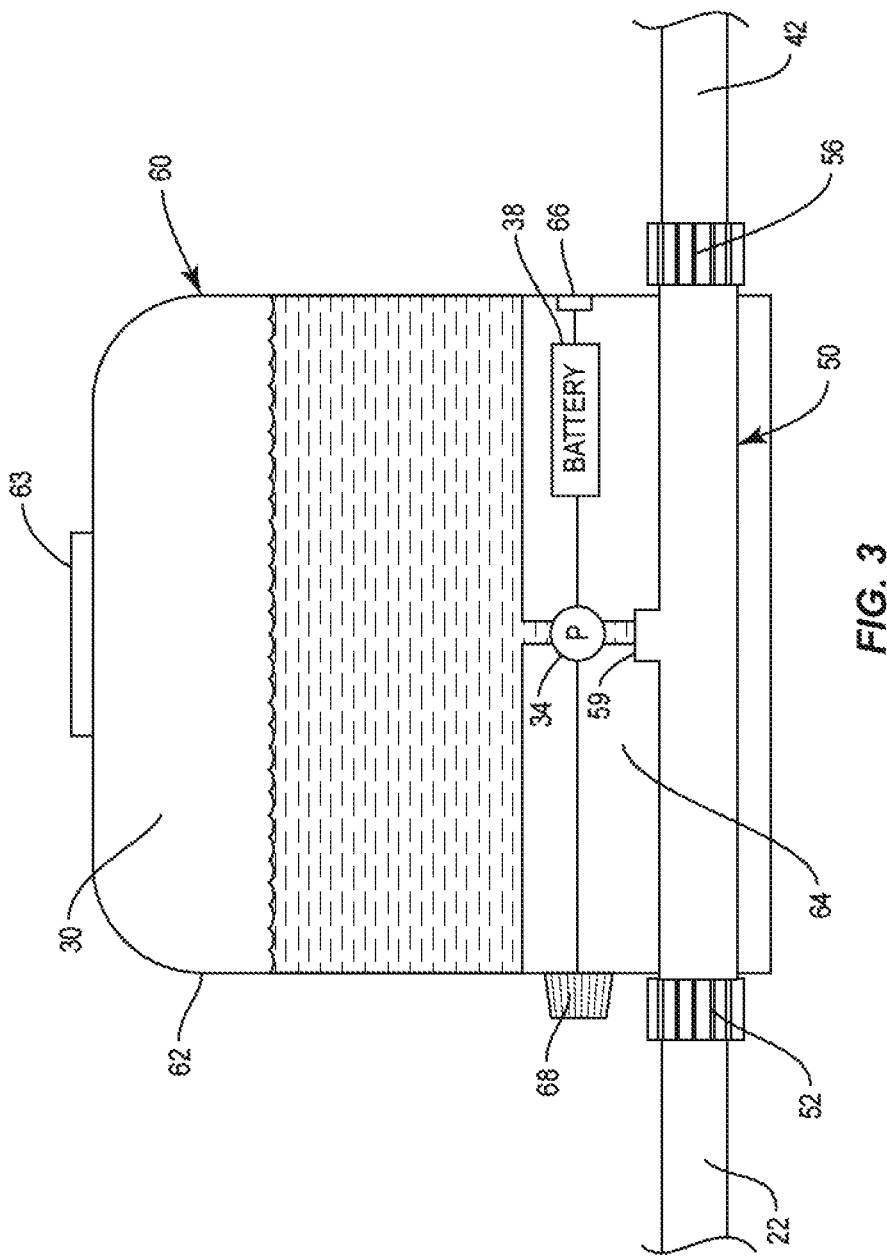
FIG. 3 illustrates an exemplary main unit for the spray system shown in FIG. 2.
Figure 4:
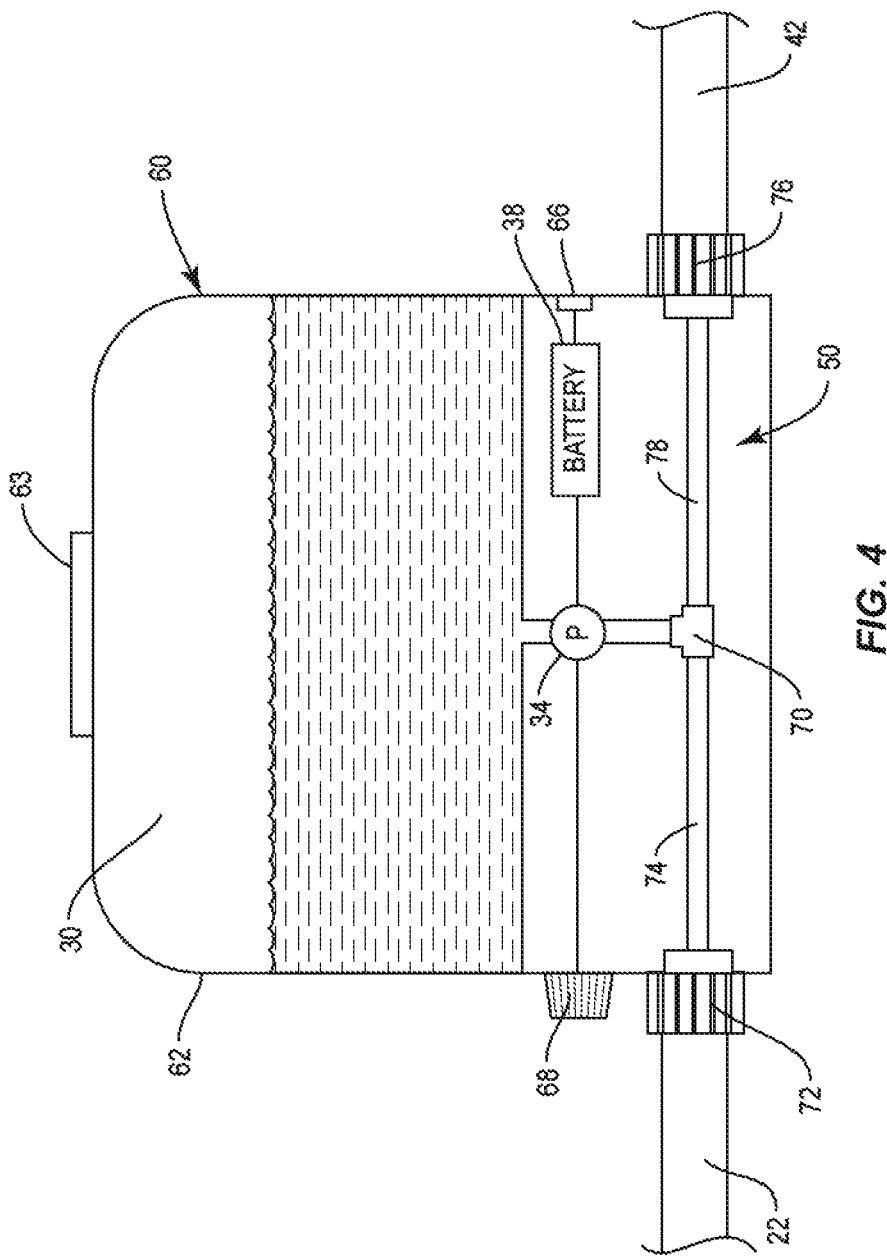
FIG. 4 illustrates an exemplary main unit for the spray system shown in FIG. 2.

FIGS. 2-4 illustrate a packaged version of the spray system 10 shown in FIG. 1. For convenience, similar reference numbers are used throughout the Figures to indicate similar components. The spray system 10 comprises a main unit 60 that contains the chemical supply tank 30 and coupling 50 as previously described. A standard garden hose 22 connects the inlet 52 of the main unit 60 to the water source 20. A second garden hose 42 connects the outlet 56 of the main unit 60 to the sprayer.

FIG. 3 illustrates one embodiment of the main unit 60. The main unit 60 comprises a molded plastic housing 62 including an upper compartment that serves as the chemical supply tank 30 and a lower compartment 64. The coupling 50 is disposed in the lower compartment 64 and is connected to the chemical supply tank 30 by an electric pump 34. A rechargeable battery 38 supplies power to the pump 4, which may be a variable pressure pump. The housing 62 may include a charge port 66 for charging the battery 38. Alternatively, battery 38 could be a replaceable battery that can be removed and charged in a separate charger. Housing 62 may also include a pressure control 68 for setting or adjusting the output pressure of the pump 34.

FIG. 4 shows an alternate embodiment of the main unit 60 where the unitary coupling 50 is replaced by a multi-piece coupling comprising a T-joint 70 and two separate fittings 72, 76 connected by lines 74, 78 respectively. Fitting 72 comprises a standard ⅝" female garden hose fitting and connects to the T-joint 70 via line 74. Fitting 72 provides an inlet 52 to the main unit 60. Fitting 76 also comprises a standard ⅝" female garden hose fitting and connects to T-joint 70 via line 78. Fitting 76 provides an outlet 56 from the main unit 60.

Those skilled in the art will appreciate that the housing 60 may contain additional features to make the spray system 10 more useful or more appealing to the user. For example, the spray system 10 could include pressure gauges to display the pressure at inlet 52, inlet 54, or both. Housing 62 could also include a gauge to indicate the amount of chemical contained in the chemical supply tank 30. Alternatively, the housing 62 could include a window allowing the user to see the level of liquid chemical in the chemical supply tank 30. The housing 60 may also include a handle to carry the main unit 60 and/or wheels to roll the main unit.

What is claimed is:

1. A spray system for applying chemicals to yards and gardens, the spray system consisting essentially of:
   a chemical supply tank;
   a sprayer for applying a chemical from the chemical supply tank;
   a coupling connecting a water source with the chemical supply tank and sprayer for mixing chemical contained in the chemical supply tank with a stream of water as the water is sprayed;
   the coupling comprising a unitary member including:
      a first inlet configured to connect to a standard garden hose for connecting the coupling to the water source;
      an outlet configured to connect to a standard garden hose for connecting the coupling to the sprayer; and
      a second inlet configured to connect to the chemical supply tank;
      a first fluid passage connecting the first inlet and outlet; and
      a second fluid passage connecting the second inlet to the first fluid passage; and
   an electric pump disposed within the housing for supplying chemical from the chemical supply tank to the second inlet of the coupling.

2. The spray system of claim 1 further comprising:
   a first garden hose connecting the first inlet of the coupling to the water source; and
   a second garden hose connecting the outlet of the coupling to the sprayer.

3. The spray system of claim 1 wherein the spray system further comprises a housing containing the chemical supply tank.

4. The spray system of claim 3 wherein the coupling is disposed within the housing.

5. The spray system of claim 1 further comprising a rechargeable battery contained within the housing for supplying electrical power to the pump.

6. The spray system of claim 1 wherein the pump comprises a variable pressure pump.

7. The spray system of claim 1 further comprising a first pressure regulator for regulating pressure at the second inlet of the coupling.

8. The spray system of claim 7 wherein the pressure regulator is an adjustable pressure regulator.

9. The spray system of claim 7 further comprising a second pressure regulator for regulating pressure at the first inlet of the coupling.

10. The spray system of claim 7 further comprising a second pressure regulator for regulating pressure at the first inlet of the coupling.

11. The spray system of claim 1 further comprising:
   a first garden hose connecting the first inlet of the coupling to the water source; and
   a second garden hose connecting the outlet of the coupling to the sprayer.

12. A spray system for applying chemicals to yards and gardens, the spray system comprising:
   a housing including an upper compartment and a lower compartment;
   a chemical supply tank disposed in the upper compartment of the housing;
   a sprayer for applying a chemical from the chemical supply tank;
   a coupling disposed in a lower compartment of the housing configured for connecting a water source with the chemical supply tank and sprayer for mixing chemical contained in the chemical supply tank with a stream of water as the water is sprayed;
   the coupling comprising a unitary member including:
      a first inlet configured to connect to a standard garden hose for connecting the coupling to the water source;
      an outlet configured to connect to a standard garden hose for connecting the coupling to the sprayer; and
      a second inlet configured to connect to the chemical supply tank;
      a first fluid passage connecting the first inlet and outlet; and
      a second fluid passage connecting the second inlet to the first fluid passage and
   an electric pump disposed within the housing for supplying chemical from the chemical supply tank to the second inlet of the coupling.

13. The spray system of claim 12 further comprising a rechargeable battery contained within the housing for supplying electrical power to the pump.

14. The spray system of claim 12 wherein the electric pump comprises a variable pressure pump.

15. The spray system of claim 12 further comprising a first pressure regulator for regulating pressure at the second inlet of the coupling.

16. The spray system of claim 15 wherein the pressure regulator is an adjustable pressure regulator.

\* \* \* \* \*